US009525731B2

(12) United States Patent
Plattner et al.

(10) Patent No.: US 9,525,731 B2
(45) Date of Patent: Dec. 20, 2016

(54) ROBUST TENANT PLACEMENT AND MIGRATION IN DATABASE-AS-A-SERVICE ENVIRONMENTS

(71) Applicant: Hasso-Plattner-Institut fuer Softwaresystemtechnik GmbH, Potsdam (DE)

(72) Inventors: Hasso Plattner, Schriesheim (DE); Jan Schaffner, Berlin (DE); TIm Januschowski, Berlin (DE)

(73) Assignee: HASSO-PLATNER-INSTITUT FUER SOFTWARESYSTEMTECHNIK GMBH, Potsdam (DE)

( * ) Notice: Subject to any disclaimer, the term of this patent is extended or adjusted under 35 U.S.C. 154(b) by 544 days.

(21) Appl. No.: 13/975,647

(22) Filed: Aug. 26, 2013

(65) Prior Publication Data

US 2014/0059232 A1 Feb. 27, 2014

(30) Foreign Application Priority Data

Aug. 24, 2012 (EP) .................................... 12181637

(51) Int. Cl.
*G06F 15/16* (2006.01)
*H04L 29/08* (2006.01)
*G06F 9/50* (2006.01)
*G06F 17/30* (2006.01)

(52) U.S. Cl.
CPC ......... *H04L 67/1029* (2013.01); *G06F 9/5027* (2013.01); *G06F 17/30575* (2013.01)

(58) Field of Classification Search
CPC .. H04L 67/1097; H04L 41/0806; H04L 43/08; H04L 47/125; H04L 47/828
See application file for complete search history.

(56) References Cited

U.S. PATENT DOCUMENTS

| 2008/0162491 | A1* | 7/2008 | Becker | G06F 17/30581 |
| 2010/0077449 | A1 | 3/2010 | Kwok et al. | |
| 2012/0173513 | A1* | 7/2012 | Agrawal | G06F 17/30448 |
| | | | | 707/716 |
| 2012/0259894 | A1* | 10/2012 | Varley | G06F 17/30575 |
| | | | | 707/795 |
| 2013/0297655 | A1* | 11/2013 | Narasayya | G06F 17/30575 |
| | | | | 707/791 |
| 2015/0142743 | A1* | 5/2015 | Zunger | G06F 13/10 |
| | | | | 707/634 |

OTHER PUBLICATIONS

SChaffner, J. et al, Predicting In_Memory Database Performance for Automating cluster Management Tasks, ICDE conference, Apr. 2011, IEEE, pp. 1264-1275.*

(Continued)

*Primary Examiner* — Djenane Bayard
(74) *Attorney, Agent, or Firm* — Walter Ottesen, P.A.

(57) ABSTRACT

A robust tenant placement and migration system, a process, and a respective controller for database-as-a-service environments are disclosed. Multiple tenants (T) are allocated on a set of in-memory database servers (S), such that workload changes depending on the tenants' behavior are considered, while maintaining strict service level objectives. The placement and migration are based on a migration command which, in turn, is based on an interleaved placement by interleaving tenants (T) across servers.

18 Claims, 5 Drawing Sheets

(56) References Cited

OTHER PUBLICATIONS

Schaffner, J. et al, "Predicting In-Memory Database Performance for Automating Cluster Management Tasks", ICDE Conference 2011, IEEE, pp. 1264 to 1275.

Schaffner, J. et al, "The Multi-Tenant Data Placement Problem", DBKDA 2012: The Fourth International Conference on Advances in Databases, Knowledge, and Data Applications, IARIA, 2012, pp. 157 to 162, XP-002693097.

Lang, W. et al, "On Energy Management, Load Balancing and Replication", SIGMOD Record, Dec. 2009, vol. 38, No. 4, pp. 35 to 42, XP-002693098.

Lang, W. et al, "Towards Multi-Tenant Performance SLOs", 2012 IEEE 28th International Conference on Data Engineering (ICDE 2012), IEEE Computer Society, pp. 702 to 713, XP002693099.

Banks, D. et al, "Toward Cloud-based Collaboration Services", HotCloud '09 Proceedings of the 2009 conference on Hot topics in cloud computing, 2009, 5 pages, XP-002693100.

English translation of the search report of the European Patent Office dated Mar. 19, 2013 in European patent application 12181637.5 on which the claim of priority is based.

Curino, C. et al, "Workload-Aware Database Monitoring and Consolidation", SIGMOD'11, Jun. 12-16, 2011, ACM, Greece, twelve pages.

Yang, F. et al, "A Scalable Data Platform for a Large Number of Small Applications", 4th Biennial Conference on Innovative Data Systems Research (CIDR), Jan. 4-7, 2009, California, ten pages.

Hsiao, H. et al, "Chained Declustering: A New Availability Strategy for Multiprocssor Database machines", in Proceeding ICDE, 1990, pp. 1 to 30.

Watanabe, A. et al, "Adaptive Overlapped Declustering: A Highly Available Data-Placement Method Balancing Access Load and Space Utilization", Proceedings of the 21st International Conference on Data Engineering (ICDE 2005), IEEE, twelve pages.

Lamport, L., "Paxos Made Simple", ACM SIGACT News (Distributed Computing Column), 32, 4 (Whole No. 121, Dec. 2001), 51-58, pp. 1 to 11.

\* cited by examiner (b) Three replicas per tenant (a) Two replicas per tenant

ROBUST TENANT PLACEMENT AND MIGRATION IN DATABASE-AS-A-SERVICE ENVIRONMENTS

CROSS REFERENCE TO RELATED APPLICATION

This application claims priority of European patent application no. 12181637.5, filed Aug. 24, 2012, the entire content of which is incorporated herein by reference.

FIELD OF THE INVENTION

The present invention generally relates to allocation of a plurality of tenants to memory storage databases and particularly to placing atomic tenants on servers in a cluster of database servers. Further, embodiments of the subject matter described herein relate to the migration of data between databases in a multi-tenant database system.

BACKGROUND OF THE INVENTION

Database as a Service (DBaaS) provides significant benefits for both the customer and service provider. DBaaS allows customers, i.e., tenants, to rent a database instance from a service provider, which relieves the customer from the hassle of provisioning the hardware and configuring, operating and maintaining the database. The service provider, on the other hand, can leverage economies of scale by automating common maintenance tasks as well as consolidating tenants onto the same machine to improve utilization and thereby decrease its operational cost. Consolidation is especially important given that—even for highly-optimized cloud infrastructures—energy consumption is still the dominant cost factor.

When sharing resources among tenants it is challenging to ensure that service-level objectives (SLOs) for tenants are met. Ideally, every tenant has the impression that its database instance is hosted on a dedicated machine with virtually infinite resources and 100% reliable hardware.

A strategy for assigning tenants to servers should therefore ensure that:

(1) tenants have enough available resources per machine and are not impacted by other tenants,
(2) the data is replicated with enough resources on all copies to cover hardware failures and
(3) a tenant's resources are seamlessly adjusted depending on a tenant's needs.

These cloud applications or platforms often have unpredictable load patterns, such as flash crowds originating from a sudden and viral popularity, resulting in the tenants' resource requirements changing with little notice. Load balancing is therefore an important feature to minimize the impact of a heavily loaded tenant on the other co-located tenants.

Furthermore, a platform deployed on a pay-per-use infrastructure (like Amazon EC2) needs to provide the potential to minimize the system's operating cost. Flexibility, i.e., the ability to scale out to deal with high load while scaling in during periods of low load, is a critical feature to minimize the operating cost. Flexible load balancing is therefore a key feature in the design of modern database management systems for cloud systems and requires a low cost technique to migrate tenants between servers within a server cloud. There is therefore a need to provide placement and migration solutions, which successfully balance running time with solution quality.

Multi-tenancy database services are known, such as Relational Cloud: "C. Curino et al., *Workload-aware database monitoring and consolidation*", In Proceeding SIGMOD, 2011 or J. Schaffner et. al., *"Predicting in-memory database performance for automating cluster management tasks"*, In Proceedings ICDE, 2011 and "Yahoo's platform for small applications": Fan Yang, Jayavel Shanmugasundaram, Ramana Yerneni: *A Scalable Data Platform for a Large Number of Small Applications*. CIDR 2009. However, both state of the art systems, Relational Cloud and the Yahoo system use static placement algorithms and do not consider the cost of tenant migrations.

Further, so called interleaved declustering strategies are known (see for example: H.-I. Hsiao und D. DeWitt, *"Chained Declustering: A New Availability Strategy for Multiprocessor Database Machines"*, In Proceeding IDCE, 1990 and A. Watanabe und H. Yokota, *"Adaptive Lapped Declustering: A Highly Available Data Placement Method Balancing Access Load and Space Utilization"* In: Proceedings ICDE, 2005). As a disadvantage all declustering strategies, however, assume that a partition (e.g. a table) can be further split into sub-partitions and hence, distributed across servers. Unfortunately, this assumption does not hold in in-memory multi-tenancy application, where a tenant is considered an atomic unit. Furthermore, existing declustering strategies assume a fixed number of servers and replicas, which is not realistic for cloud environments.

US 2010/0077449 discloses a method for assigning tenants to application or middleware instances. Here, the assigning is also based on server resource capacity and constraints. However, this approach does not take into account that the number of servers may vary dynamically. This has the disadvantage that the number of servers may not be reduced as much as possible and thus more costs will be generated. Further, the assigning or mapping according to this disclosure is based on the fact that there is no replication of tenants and, thus, each tenant only exists once, which shows disadvantages with regard to server failures or server overload situations.

A common approach to address the above mentioned goals starts by monitoring each tenant for some period of time on dedicated servers and developing an estimate of their peak resource consumption. This approach is for example disclosed in F. Yang, J. Shanmugasundaram and R. Yerneni, *"A Scalable Data Platform for a Large Number of Small Applications,"* In Proceedings CIDR, 2009. Based on this estimate a bin-packing algorithm is run to allocate tenants to servers, perhaps folding new tenants into an existing cluster. A bin-packing algorithm refers to an allocation procedure where objects of different volumes (tenants) must be packed (allocated) into a finite number of bins of capacity (database storage servers) in a way that minimizes the number of bins used. Typically, the whole placement is mirrored (i.e., replicated) to ensure fault-tolerance.

FIG. 1 shows such a placement in a fictive example of 5 tenants with different estimated peak resource needs (the servers' capacities are normalized to 1) using a first fit algorithm and a mirroring technique as known from the state of the art. The total normalized load per tenant is: A (0.3), B (0.3), C (0.4), D (0.4), E (0.3). The capacity per server is 1.0. However, this approach has severe disadvantages: First, the cluster has to be substantially over-provisioned as it has to reserve capacity for peak loads. Second, servers are more than 50% underutilized for the normal operational case even at peak times. This is due to the fact that, in the case of a read-mostly workload, the load can be distributed evenly across the copies (e.g., the total load of tenant A of 0.3 is spread across server 1 and 3 in FIG. 1). However, upon the failure of a server, its mirror must take over the entire load. Third, reacting to changing resource requirements and/or improved estimates, is problematic as it requires a re-organization of the placement and typically has to be done off-line because of its operational and performance impact on the cluster.

SUMMARY OF THE INVENTION

Accordingly, there is a need for improved systems and methods for tenant placement and for migrating data between databases. One object is to provide a system, product and method which consider the cost of tenant migrations. Further, migrating tenants between servers should consider minimizing the utilization of the cluster as a whole. Furthermore, tenant placement and migration should consider tenant replication strategies and robustness towards server failures. With respect to cloud environments, where tenant's needs may vary significantly, known approaches which are based on a fixed number of servers and replicas, are to be improved as they are no longer realistic.

In the following, the invention will be described with respect to the method. However, the invention also might be implemented in hardware or in hardware modules, possibly combined with software modules. The hardware modules are then adapted to perform the functionality of the steps of the method, described above. Accordingly, the steps, claimed or described with respect to the method may also be transferred to and implemented as hardware modules, adapted to provide the respective functionality. For example the method step "storing data" may accordingly be implemented by a "storage unit," which is adapted to store the data and vice versa. It is also possible to have a combination of hardware and software modules. The modules are preferably integrated into an existing database environment, for example into a DBaaS platform, comprising servers and hosts with DRAM memory modules.

According to one aspect, the present invention is directed to a method for controlling allocation of at least one tenant or a set of tenants (as a cloud user) to database servers in a server cluster. The cluster may also be referred to as a cloud network system (physically connected) or a set of physical servers which implement a database-as-a-service-environment and preferably comprise a plurality of in-memory database servers which serve as (middleware) memory capacity.

The method comprises:
Dynamically (i.e., periodically or incrementally) measuring workload of all or selected tenants within a recording period and providing measurement signals. The measurement signals are detected as a result of measurement in the supervision or monitoring (recording) period, which might be configured in a configuration phase. Measuring takes into account additional workload of a specific server due to a hardware failure of another server and/or due to an additional tenant's access requests. The monitoring period is to be construed as a sliding window (e.g., 10 minutes), in order to detect the workload on the respective tenant.
Detecting a DRAM capacity of each server.
Continuously applying an adaptive and recovery-aware migration command. The migration command refers to a complex procedure, which may be implemented by means of a plurality of placement (and migration) algorithms. The migration command is adapted to control allocation (or placement) of the set of tenants to servers. The migration command may be executed on different computer instances. In the preferred embodiment the migration command is executed on a controller. The controller may be implemented on a dedicated server node or may be implemented in the database management system.
Automatically generating the migration command, being based on the measurement signals and on the detected DRAM capacity of each of the servers of the cloud of servers by applying an interleaved replication so that not the whole server is replicated, but each tenant, which has been allocated to a server is replicated separately and interleaved in order to recover overload situations. The migration command allocates a variable number of replicas, but at least two replicas (or copies) of a variable number of tenants to a variable number of servers. The migration command or command sequence thereby considers that a number of active (or already allocated, used) servers in the cluster is to be minimized, while maximizing performance of the server cluster as a whole. According to an alternative incremental embodiment, a placement will be found with the least amount of overloaded servers, instead of minimizing the number of active servers.
Allocating tenants to servers by continuously executing the migration command.

It is to be noted that the sequence of the method steps may be varied. Thus, for example it is possible to first detect the DRAM capacity and then to measure workload. Further, method steps may be performed by one or more programmable processors or microprocessors executing a computer program in order to perform the above mentioned functions. However, it is also possible to directly implement the method in hardware, i.e., in a microprocessor circuitry (like FGPA or other integrated circuits etc.).

It has to be noted that the control of the tenant-server-placement according to the invention is dynamic, i.e., it considers and computes the change of the tenant's load over time.

Further, the costs for migrating a tenant to another server are considered for placement and migration control. In particular, the overall costs, regarding the whole system are considered (not only tenant/server specific.).

In the following there is given a short explanation or definition of terms used within this application.

"Allocating" refers to a placement or assignment of a tenant to a database server. Thus, physical memory volume is assigned to a set of requesting computer instances (tenants).

A "tenant" generally refers to a computer instance or to a group of computer based instances which is/are accessing data on a database. The access may be based on an internet access transfer protocol (i.e., TCP-IP) or by other protocols and/or networks. Typically the tenants access their "own" private databases/tables. However, it might also be possible that the data may be shared by the tenants. As usually multiple tenants access the cloud system, the system is also called multi-tenant system. In an example, tenants may represent customers, customer departments, business or legal organizations, and/or any other entities that maintain data for particular sets of computers within the system. Although multiple tenants may share access to the server or database, the particular data and services provided from the server to each tenant can be securely isolated from those provided to other tenants. The multi-tenant architecture therefore allows different sets of users to share functionality without necessarily sharing any of the data.

The database is any sort of repository or other physical data storage medium capable of storing and managing associated with any number of tenants. The database may be implemented using any type of conventional database server hardware.

According to a preferred embodiment the database is an in-memory database. The in-memory database primarily relies on main memory (in contrast to disk storage based databases) for computer data storage. Accessing in-memory databases is accompanied with reduced Input/Output access activity when querying the data which provides faster and more predictable performance than disk-based systems. However, in an alternative embodiment in-memory database may also be combined with external, disk-based databases or virtual database systems (hybrid system). The database typically comprises an amount of DRAM (Dynamic random-access memory) capacity. Alternatively, other volatile storage cells may be used as an SDRAM (Synchronous dynamic RAM) or a SRAM (Static random-access memory). The term DRAM capacity should be construed as memory capacity, in case other storage cells are used. The memory capacity may vary from server to server and typically is not constant over time. Present placement and migration concept considers this aspect. Therefore, according to a preferred embodiment the memory or DRAM capacity of the servers are detected or measured dynamically in order to be able to represent changes in servers' memory capacity. Generally, data format (for example required by the tenant) and access strategies are not limited to a specific type. According to a preferred embodiment of the present application, the database may be implemented as a transactional database, where write transactions on the database are able to be rolled back if they could not be completed properly (e.g. due to failure, like power or connectivity loss). In the database system a transaction might consist of one or more data-manipulation statements and queries, comprising reading and/or writing accesses and instructions (i.e. SQL instructions) to the database.

Usually, the database used in the DBaaS cluster is an in-memory column database, such as employed by some of SAP's on-demand applications. The advantage of in-memory database instances are that the two main resources consumed by the system, CPU and main memory, combine almost linearly when running multiple databases on the same physical machine. However, for conventional disk-based databases non-linear functions could be applied to the method and system described here to determine the combined load of two or more tenants on the same machine with shared disk-access.

The server is implemented using one or more actual and/or virtual computing systems. The server typically operates with any sort of conventional processing hardware, such as a processor (CPU: central processing unit), memory, input/output interfaces and the like. The processor may be implemented using one or more of microprocessors, microcontrollers, processing cores and/or other computing resources spread across any number of distributed or integrated systems, including any number of "cloud-based" or other virtual systems. The memory represents any non-transitory short or long term storage capable of storing programming instructions for execution on the processor, including any sort of random access memory (RAM), read only memory (ROM), flash memory, magnetic or optical mass storage, and/or the like. The input/output interfaces represent conventional interfaces to networks (e.g., to the tenant or to a network, or any other local area, wide area or other network), mass storage, display devices, data entry devices and/or the like. As noted above, the server may be implemented using a cluster of actual and/or virtual servers operating in conjunction with each other, typically in association with conventional network communications, cluster management, load balancing and other features as appropriate. The server and/or the other computer-based instances of the system which are adapted to implement the allocation and migration method are typically coupled through the I/O interfaces to a display and various input devices such as a mouse and keyboard. The support circuits can include circuits such as cache, power supplies, clock circuits, and a communications bus.

The term "a tenant is replicated separately" is to be construed to mean that not the whole server is mirrored but each tenant which has been allocated to the server is moved to another (replication) server independently and/or separately of the other tenants, which are also allocated to the server. For example, if tenant A and tenant B are placed on server 1 and now server 1 should be migrated, then a migration target server 2 will be determined for tenant A and a migration target server 3 will be determined for tenant B as well, where server 2 and server 3 may be (and typically are) different servers. Thus, the number of original servers (before migration) and the number of migration servers (after migration) need not necessarily be the same. The migration command considers this as an optimization strategy, so that at best the number of migration servers, after migration, is lower than before. The tenant is an atomic unit and cannot be partitioned.

According to a preferred embodiment, workloads are read-mostly workloads, such as encountered in OLAP scenarios, which means that write-accesses are executed only rarely (for example, periodically, every 30 minutes per tenant). Therefore, it is sufficient to serialize all write-accesses and retain the replicas per tenant synchronous by means of a 2PC protocol (two phase commit protocol). These OLAP workloads allow to equally distribute the load across multiple replicas. Possibly surprising, for write-heavy workloads tenants are often easier to place since the load is not shared across the copies of a tenant making mirroring strategies as attractive as interleaving.

Typically, the workload measurements are in-memory-specific. However, it is also possible to apply the method with the placement algorithms to non in-memory and thus "traditional" databases.

According to a preferred embodiment the migration command is based on an incremental placement algorithm, when placing a single replica of a tenant on a server, inter alia on a tabu algorithm, a robustfit algorithm, a robustfit-merge or a splitmerge algorithm. Using incremental algorithms has the advantage to consider changes in tenant's load over time.

Preferably, the migration command (for the incremental placement algorithm) considers a migration budget. The migration or move budget represents a limit of data to be migrated in order to change or adapt a given placement.

The migration command might comprise the following steps, when placing a single replica of a tenant on a server:
Computing for each server its load and its penalty and generating an ordered server result list
Allocating a respective tenant according to the ordered server result list.

The term "penalty" is to be construed as general costs for reserving spare capacity for excess load, which might be caused by server failure or demanding tenants' access requests. Particularly, penalty denotes the fraction or section of (spare) capacity of a server that must be left unused such that additional load due to a single server failure does not cause an SLO violation. Therefore, on each server the load (or residue capacity) is detected and, based on this, the penalty is computed. In doing so, the respective server for which the penalty is to be computed, is compared to all other servers, for measuring (detecting) an overlap of tenants. The overlap is represented in load. Finally, the penalty is the result of this statistical computation and is the maximum of all pairwise comparisons. Thus, a statistical analysis is executed in order to compute a variance over all servers with respect to penalty, with the goal of balancing the penalty across all servers. Penalty is thus related to robustness and reliability of the database placement. It is to be noted that the sum of load and penalty (of a server) must not exceed a load capacity of the respective server. With other words: If load_capacity of the respective server i=1.0. Then, for server i the following requirement has to be fulfilled:

Load (*i*)+penalty (*i*)<1.0, in order to ensure that the server is failsafe and placement or migration is robust.

In contrast to using incremental placement algorithms, the migration command might also be based on a static placement algorithm. In this case, inter alia a greedy algorithm may be used, which in turn may be based on a best-fit-algorithm, a robustfit-s-mirror algorithm, a robustfit-s-interleaved or a robustfit-s-2atonce algorithm or a tabu algorithm. It has to be noted that these known algorithms are adapted to be usable for the framework according to the invention, i.e., for considering re-allocation or migration of workload for the entirety of all servers.

According to an aspect of present invention, the number of replicas per tenant is determined dynamically and may vary according to present cluster (tenant, server) conditions. According to a preferred embodiment the number of replicas (per tenant) is computed in relation to the load, wherein the load is distributed (as uniformly or evenly as possible) over all copies of a tenant.

Preferably, at least one replica of a tenant is removed if it is detected as unnecessary, particularly if a removal condition is met. The removal condition is based on the lower bound signal. When the load of a tenant has decreased in comparison to a previous interval (relating to the recording period), it might be the case that removing a replica of the tenant is possible. Therefore, in this phase, a heuristically selected replica of all tenants meeting this removal condition is deleted. Preferably, removing the at least one replica does not count towards the migration budget.

The lower bound signal refers to a lower limit for the number of replicas per tenant. In the detailed description the lower bound will be specified in detail relating to r(t).

Preferably, a safe migration source mechanism is provided which is adapted to ensure that at least during a period of a migration of a tenant a safe migration source does exist in order to handle migration flexibly without violating SLO constraints. The safe migration mechanism ensures that all tenants are assigned to at least one server from which the tenant can safely be migrated away without SLO violation. This is done by moving one replica of a tenant without a safe migration source to another server. For determining this server, the plugged in algorithm is used. The reason for implementing the safe migration source mechanism is that during a migration (phase), the servers, being involved in a migration process, could only process less queries in order to still comply with SLO constraints. Thus, the load which one server may handle maximally, temporarily drops (from 1.0 to 0.83 or 0.85, depending on the server being migration destination or migration source). If at least one server in the cluster may be found (calculated) which has a corresponding minor load, this server will be a determined as a safe migration source for the tenant. This enhances safeguarding the database placement and migration against failures.

According to a further aspect of the present application at least one replica of a tenant is added if necessary, particularly if an updated lower bound signal is detected and is meeting an addition condition. The addition condition is based on an increased lower bound of a tenant's replicas (due to increasing load). This phase handles the opposite case of the removal condition, mentioned above, where the lower bound on a tenant's replicas has increased as a result of increasing load. The plugged in algorithm is used to place enough extra replicas as necessary to match the new lower bound. When the load of a tenant has increased in comparison to a previous interval, it might be the case that adding a replica of the tenant is necessary. Therefore, in this phase, a (heuristically selected) replica of a tenant meeting this addition condition is added.

According to a preferred embodiment of the present invention, server overload is detected dynamically and in case of an overloaded server as many tenants as necessary are moved away from the overloaded server so that it is no longer overloaded. Other servers must be found for the tenant replicas to be moved. This step is handled by a plugged in algorithm.

According to a further preferred embodiment of present invention, the migration command migrates tenants between the servers of the server cluster in order to minimize the number of the active or used (allocated) servers in the cluster as a whole and/or may be used to predict a tenant's load before load changes occur to be considered for tenant placement.

According to a further preferred embodiment of the present invention, the migration command ensures that no servers are allocated that have a much higher penalty than other servers. The penalty might be compared and evaluated for all servers of the server cluster by statistical methods (computation of variance), particularly, when it is no longer possible to reduce the number of allocated servers in the cluster.

According to a further preferred embodiment of present invention, the migration command may be applied for an un-allocated set of tenants so that tenants are to be allocated to the set of servers in the cluster for the first time. Alternatively, it is also possible to apply the migration command for already allocated tenants so that a given tenant-server-placement eventually may be changed (for example in reply to changed load conditions).

Advantageously, the migration command considers migration costs. Thus, it is possible to evaluate all operational costs for this procedure and the benefit implied with it before changing a given tenant placement. According to an embodiment, costs are measured as a number of the active servers in the cluster and/or the cluster performance as a whole.

According to a further preferred embodiment of the present invention, a trigger signal is detected which triggers applying the continuous and recovery-aware migration command, wherein the trigger signal refers to the periodically measured workload of all servers in the cluster and/or to a result of a placement algorithm which is monitored dynamically. Thus, the migration command may be activated or deactivated. Further, the embodiments described herein may also be subject to the trigger signal and thus can be activated or deactivated according to actual tenant-server-conditions.

According to a further preferred embodiment of the present invention, the migration command ensures that a tenant's load does not exceed the DRAM capacity and the processing capabilities of the server to be allocated, wherein spare capacity on each server is reserved for excess load of a failed server which is captured by the penalty.

According to a further preferred embodiment of the present invention, a number of servers and/or a number of replicas per tenant may vary and is at least one and is determined dynamically for the migration command.

According to a further preferred embodiment of the present invention, the migration command controls tenant allocation and ensures that a replica of the set of replicas of a respective tenant is assigned to a server exactly once.

According to a further preferred embodiment of the present invention, the migration command ensures that no two copies of the same tenant are placed on the same server.

Another aspect of the present invention refers to an allocation controller for controlling allocation of a set of atomic tenants to database servers in a server cluster, comprising:
- A measurement means which is adapted to dynamically and incrementally measure workload of all or selected tenants within a pre-configurable recording period and providing measurement signals, taking into account additional workload due to a hardware failure and/or a tenant's access requests
- A detection module, which is adapted to detect a DRAM capacity of each server in the cluster
  - wherein the controller is adapted to apply an adaptive and recovery-aware migration command for continuously controlling allocation of the set of tenants to servers, wherein the controller interacts with the measurement means and with the detection module such as the allocation control is based on the measurement signals and on the detected DRAM capacity of each of the servers and
  - wherein the controller controls allocation of tenants to servers by applying an interleaved replication so that not the whole server is replicated, but each tenant, which has been allocated to a server is replicated separately and interleaved in order to react to overload situations, wherein a number of allocated servers in the cluster is minimized, while maximizing performance of the server cluster and wherein at least two replicas of a variable number of tenants are assigned to a variable number of servers.

The controller might be implemented as a software package and might be run on a dedicated infrastructural node in the cluster, the cloud or in the network. Optionally, the controller might be run in a module within a database management system (DBMS) or within a module which interacts with the DBMS system, particularly in case of a distributed database, which is controlled centrally. Further, means are provided in order to ensure that the controller itself runs reliably. The controller may be implemented on all of the servers, wherein typically only one server is active and acts as master server. All servers in common are responsible for defining a new master server in case the actual master fails. A so called Paxos algorithm (see: Lamport, Leslie (2001). Paxos Made Simple ACM SIGACT News (Distributed Computing Column) 32, 4 (Whole Number 121, December 2001) 51-58.) may be applied in this case.

A major advantage of the placement and migration schedule described here is to reduce the operational cost for in-memory DBaaS by interleaving tenants across machines and incrementally adjusting the tenant placement to workload changes while maintaining their service level objectives (SLOs). In contrast to the mirroring-based approach, mentioned as a state of the art system, interleaved placements try to avoid co-locating any pair of tenants on more than one server. This has the advantage that, in case of a server failure, the excess load spreads across multiple nodes allowing to decrease the required "headroom" to handle failures and thus, improve utilization.

The method and system disclosed here, considered not only different tenant sizes and request rates, but also varying numbers of replicas. This makes the method much more flexible compared to state of the art systems. Further, the underlying model is extended to dynamic scenarios, where tenants' behavior changes over time and, building on existing placements, incrementally changed placements are considered. This is achieved by supporting step-wise changes and considering the cost of migrating a tenant from one machine to another. Unfortunately, even for a small number of tenants and servers, finding an optimal solution is often impractical because of the computational complexity of the problem, which is proportional to $(N^2)^T$, where N is the number of active servers and T is the number of tenants. Therefore, heuristics are provided, which extend well-known bin-packing algorithms such as best-fit, for static as well as incremental DBaaS tenant placement. Evaluations using real-world traces from on-demand applications show that incremental algorithms are able to achieve an order of magnitude improvement in cost over the static best-fit mirroring placements.

Thus interleaved data placement for multi-tenancy DBaaS is considered here.

The present application allows for placement algorithms to be used for a wide variety of hosted database services in the cloud, such as MySQL or in-memory database systems. Furthermore, incremental changes to the placement while taking the impact of the re-organization on the SLO into account are considered.

Another aspect of the invention refers to a computer program being loadable in a memory of a computer, wherein the computer program is adapted to carry out the steps of the method as mentioned above.

Moreover, another aspect relates to a system and a product for allocating and placing tenants on servers by applying the method as described above. The method is computer-implemented and may be executed on different computer instances as a distributed system. The computer program product is tangibly embodied on a non-transitory computer readable medium and comprises computer instructions, that when executed, are configured to perform the method as described above.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DESCRIPTION OF THE PREFERRED EMBODIMENTS OF THE INVENTION

Figure 1:
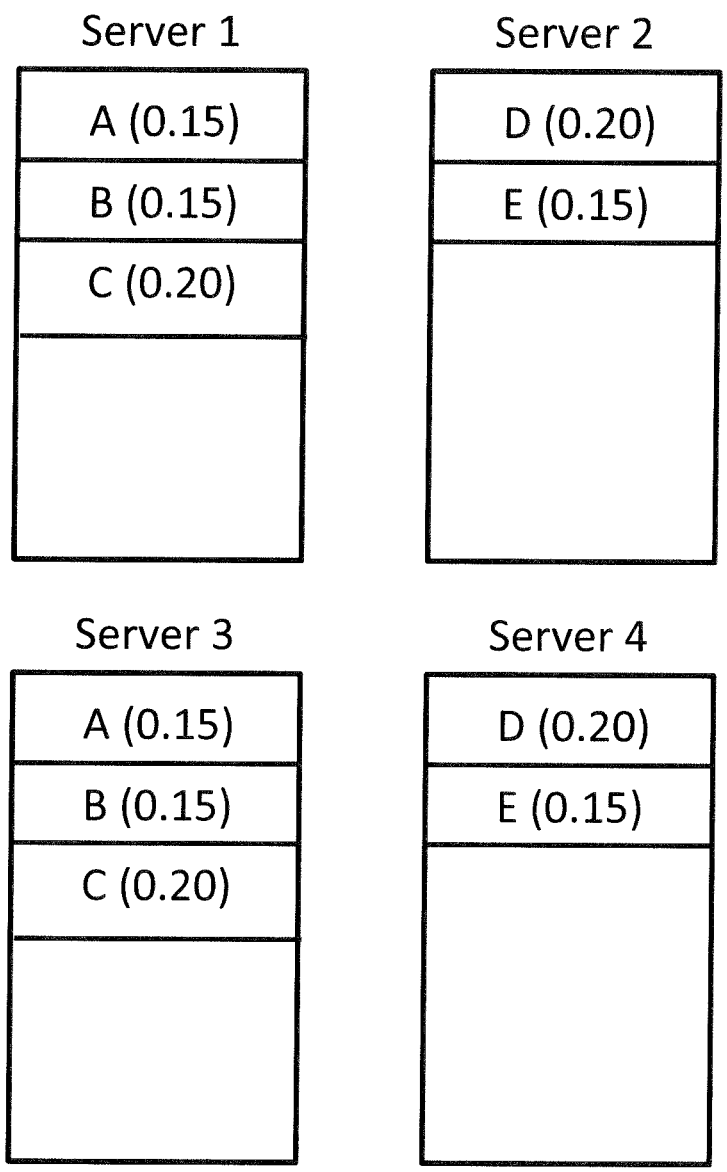
FIG. 1 is a schematic overview of a mirrored tenant placement according to a state of the art system, using a first fit algorithm.

The figures illustrate principles of the invention according to specific embodiments. Thus, it is also possible to implement the invention in other embodiments, so that these figures are only to be construed as examples. Moreover, in the figures, like reference numerals designate corresponding modules or items throughout the different drawings.

The method according to the present application explores algorithms to reduce the operational cost for in-memory DBaaS by interleaving tenants T across machines (in the following also called: servers) S and incrementally adjusting the tenant placement to workload changes while maintaining their service level objectives (SLOs).

In contrast to the known mirroring-based approach, which has been explained as prior art with respect to FIG. 1, interleaved placements according to a preferred embodiment of the present invention try to avoid co-locating any pair of tenants on more than one server S. This has the advantage that, in case of a server failure, the excess load spreads across multiple nodes allowing to decrease the required "headroom" to handle failures and thus, improve utilization.

Figure 2:
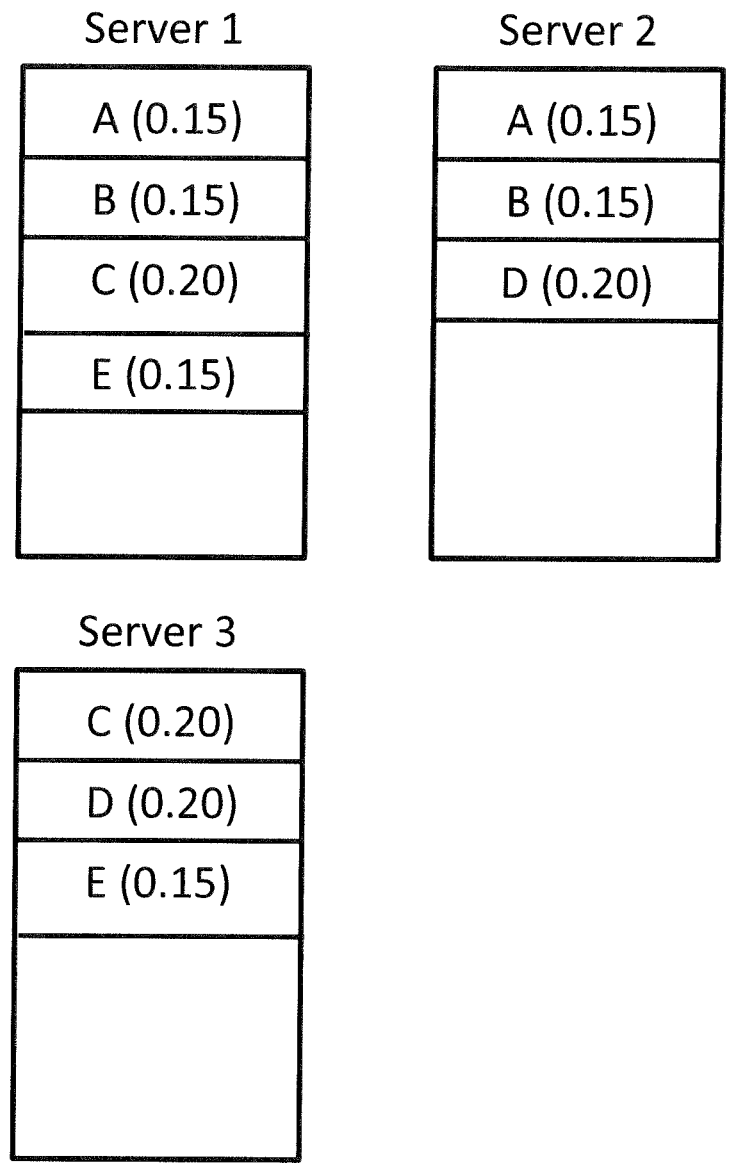
FIG. 2 is a schematic overview of an interleaved tenant placement according to a preferred embodiment of the present application.

FIG. 2 shows an interleaved placement according to a preferred embodiment of the present application for the same example as described with respect to FIG. 1. For example in this placement, a failure of server 1 would distribute the load of tenant A and B to server 2 and tenant C and E to server 3. As a result, the layout requires only three instead of four servers to seamlessly cover one server failure.

Figure 4:
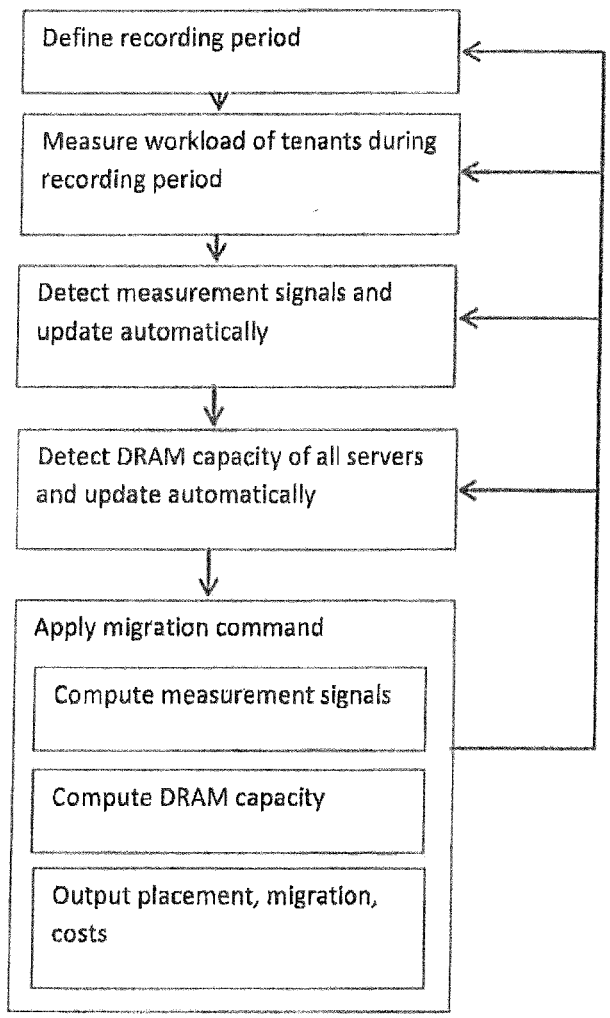
FIG. 4 is a flow chart according to a preferred embodiment of an allocation and migration method.

With respect to FIG. 4, a flow chart is explained below. In a configuration phase input parameters are detected and measured. As can be seen in FIG. 4 the recording period (length of time interval, possible interrupts thereof etc.), the workloads of all tenants T, the DRAM capacity of all servers S are detected automatically. These steps may be executed directly on the tenants T and/or on the servers S. After this the placement and migration phase may start. In this placement phase the tenants T are in fact allocated to the servers S, depending on the workload behavior of the tenants T, while maintaining SLO objectives, minimizing a number of active servers S in the cluster and while maximizing performance of the server cluster as a whole.

In the placement and migration phase a migration command is executed, by computing the measurement signals and the DRAM capacity of the servers S in order to allocates tenants T to servers S by applying an interleaved replication so that each tenant T, which has been allocated to a server S is replicated separately (from other tenants T) and interleaved in order to recover overload situations.

The present application also refers to a controller C for controlling the placement and migration process which will be explained by way of example referring to FIG. 3.

Figure 3:
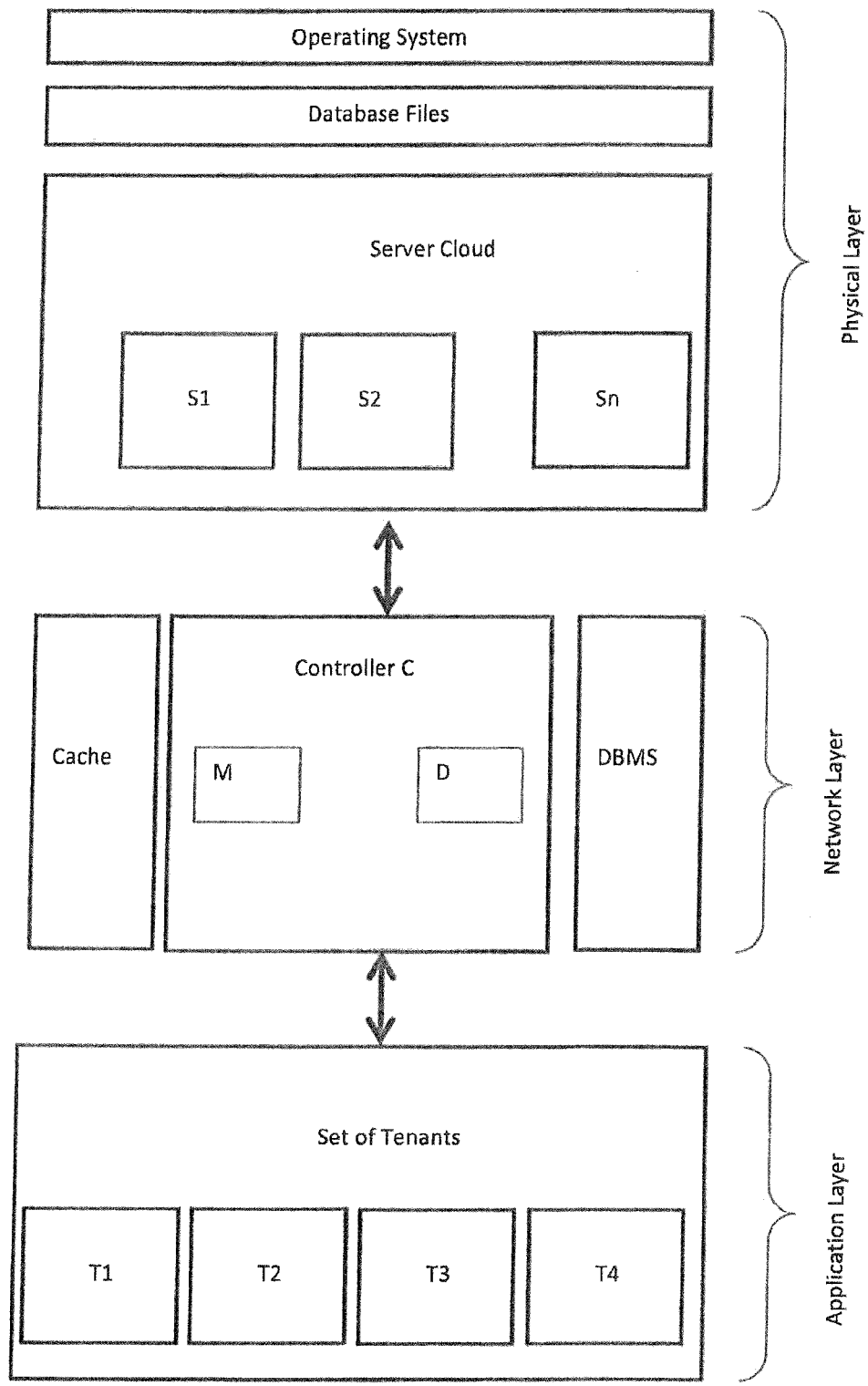
FIG. 3 is a schematic overview of a tenant placement environment.

FIG. 3 shows computer-based instances of a database as a service environment with regard to different abstraction levels. At the top of FIG. 3 a physical layer is depicted with operating system and physical database files and with the server cloud, comprising the servers S1, S2, . . . Sn.

The next layer below (depicted in the middle of FIG. 3) refers to the network layer and in this example comprises the controller C with a measurement means M and with a detection module D. The measurement means M is adapted to measure workload of all or of selected tenants T and the detection module D is adapted to detect the DRAM capacity of the servers S in the cloud (cluster). Controller C may interact with a database management system DBMS or may be implemented in the DBMS directly. Further, controller C interacts with a cache in this example.

At the bottom there is depicted an application layer with the set of tenants T and different application systems.

It is to be noted that controller C may also be implemented in one or more of the servers directly.

Principally, two different placement strategies may be applied:
1. Static placement
2. Incremental or dynamic or continuous placement.

The goal of robust tenant placement according to this application (abbreviated as: RTP) is to assign at least two copies of a given number of tenants T to a number of (cloud) servers S such that
  no server S is overloaded in terms of memory and/or CPU,
  no server S contains more than one copy per tenant T,
  the failure of a single server S does not cause overloading of any other server S, and
  the number of active servers S is minimal, i.e., the number of servers S that hold at least one tenant T with non-zero size or non-zero load.

In contrast to state of the art systems as, for example, disclosed in US 2010/0077449, the placement and migration according to this application considers a dynamically changing number of servers. Thus, according to the present application the number of servers S to be evaluated for placement and migration is not predetermined and may be reduced if possible, which in turn reduces overall costs significantly. Further, according to the present application there is a replication of tenants T on servers S of the cluster. Preferably, at least two copies or replicas do exist for one tenant T. Accordingly, the placement pursuant to 2010/0077449 is less complex and does not consider an interleaving of tenant placement, a penalty and a dynamic number of replicas and the costs for migration (inter alia considering a temporary reduction of capacity, an availability of safe migration source servers).

Another major difference is to be seen in that US 2010/0077449 does not consider a "migration budget." Such a migration or move budget is defined in order to determine how much data at all may be migrated for adapting (which is: optimizing) a given placement. An incremental placement algorithm according to an embodiment of present application does take into account a migration budget for tenant migration by means of executing the migration command.

A tenant t is characterized by its size $\sigma(t)$ (i.e., the amount of main memory each replica of the tenant consumes) and its load $l(t)$.

The term $l(t)$ is a metric that combines all resources other than RAM that are necessary for query processing in a multiple tenants environment. The availability of such a metric is crucial for implementing multi-tenant DBaaS. For in-memory column databases, the latter depends on the current request rates of the tenant's users as well as the size of the tenant T. It is to be noted that—for in-memory column databases—load is additive, i.e., the load on a server S is the sum of the individual loads of all tenants T on the server S.

It is assumed that queries are load balanced across tenant replicas in a round-robin fashion. Thus, a server S only receives a fraction of the total load of a tenant T, depending on how many replicas it has.

At first glance, RTP resembles the two-dimensional bin-packing with conflicts problem, where the conflicts arise from the constraint that no server may hold more than one copy of the same tenant. However, RTP is different from the two-dimensional bin-packing with conflicts problem because the placement shall be robust towards server failures. A server failure causes a load increase on those servers that hold copies of the tenants that were assigned to the failed server. RTP requires that even with the additional load caused by a failure no servers S must be overloaded.

A so-called assignment formulation is used to model and formalize RTP and thereinafter, two extensions of RTP are described: dynamically determining the number of replicas per tenant T and ensuring that tenants T can be migrated between servers S without SLO violations.

A valid instance of RTP has the following data as input:
- $T \subseteq \mathbb{N}$, the set of tenants.
- $N \subseteq \mathbb{N}$, the set of available servers.
- $R = \{1, 2, \ldots r(t)\}$, the replicas per tenant where $r(t) \geq 2$ is the (fixed) number of replicas per tenant;
- $\sigma: T \rightarrow \mathbb{N}^+$, a function returning the DRAM requirement of a given tenant T.
- $cap_\sigma: N \rightarrow \mathbb{N}^+$, a function returning the DRAM capacity of a given server S.
- $l: T \rightarrow \mathbb{Q}^+$, a function returning the current load of a given tenant T.
- $cap_l: N \rightarrow \mathbb{Q}^+$, a function returning the request processing capacity of a given server S.

In the following it is differentiated between input parameters and decision variables by denoting variables with sub-indices whereas input parameters have functional notation.

The formulation of the RIP uses a binary decision variable $\gamma \in \{0,1\}^{N \times T \times R}$ where $$y_{t,i}^{(k)} = \begin{cases} 1, & \text{if copy } k \text{ of tenant } t \text{ is on server } i \\ x, & \text{otherwise} \end{cases}$$

A valid solution of RTP must assign appropriate values to the following further decision variables:
- $s \in \{0,1\}^N$, where $s_i = 1$ denotes that server i is active and otherwise, the server S is not active.
- $p \in \mathbb{Q}_+^N$, where $p_i$ denotes the fraction of the capacity of server i that must be left unused such that additional load due to a single server failure does not cause an SLO violation.
- $p_i$ is called the penalty that must be reserved on server i The objective of the RTP is to minimize the number of active servers S, i.e., $$\min \sum_{i \in N} s_i \quad (1)$$

A solution of the RTP must obey the following constraints.

$$\sum_{i \in N} y_{t,i}^{(k)} = 1 \quad (2)$$

$$\forall t \in T \forall k \in R$$

Constraint (2) ensures that each replica $1 \leq k \leq r(t)$ of a tenant t is assigned to a server exactly once.

$$\sum_{i \in N} y_{t,i}^{(k)} \leq 1 \quad (3)$$

$$\forall t \in T \forall i \in N$$

Constraint (3) ensures that no two copies of the same tenant are placed on the same server.

$$\sum_{t \in T} \sum_{k \in R} \sigma(t) * y_{t,k}^{(k)} \leq cap_\sigma(i) * s_i \quad (4)$$

$$\forall i \in N$$

Constraint (4) ensures that the tenants' load on a server does not exceed the server's DRAM capacity. Note that a server is active when at least one tenant is assigned to the server, since $s_i$ must be one to fulfill the constraint.

Similar to Constraint (4), the next constraint ensures that the tenants' load on a server does not exceed the processing capabilities of the server. Due to our round-robin load balancing assumption, each server holding a replica of tenant t receives only $1/r(t)$-th of $l(t)$.

$$\sum_{t \in T} \sum_{k \in R} \frac{l(t)}{r(t)} * y_{t,i}^{(k)} + p_i \leq cap_l(i) * s_i \quad (5)$$

$$\forall i \in N$$

In addition to accumulated tenants' loads, each server S must be capable of handling potential additional load in case another server fails. The spare capacity reserved for this excess load is captured by penalty $p_i$ in Constraint (5). In the following constraint, the penalty p is set.

$$p_i = \max_{j \in N: j \neq i} \sum_{t \in T} \sum_{k \in R} \sum_{k' \in R} \frac{l(t)}{r(t)^2 - r(t)} * y_{t,i}^{(k)} * y_{t,j}^{(k')} \quad (6)$$

$$\forall i \in N$$

What fraction of a tenant's load must be added to $p_i$ depends on the number of remaining replicas. If server j handled a fraction $$\frac{l(t)}{r(t)}$$

of the load or tenant t prior to the failure, then the remaining $r(t)-1$ replicas of tenant t must share the load after the failure (according to our round-robin load balancing assumption). Hence, the extra load that server i must support is $$\frac{l(t)}{r(t)} * \frac{1}{r(t) - 1} = \frac{l(t)}{r(t)^2 - r(t)}.$$

Constraint (6) ensures that $p_i$ is set such that server i can cover a worst-case single server failure. The constraint has a special property that renders standard heuristics for bin-packing unusable for RTP: given three servers U, V, and W, moving a tenant from V to W might increase $p_U$ and thus render server U unable to sustain the extra load coming from another server failing.

It is to be noted that also other solutions are within the scope of this application. For example, it is possible to apply the method with equally (load) balanced placements which could be easily integrated into the objective function. Another possibility is to apply a mixed integer program (see below). Less closely related formulations with other choices of decision variables are also conceivable. The preferred embodiment has the advantage of enhanced flexibility and expressivity.

Above it was described that the number of replicas per tenant r(t) was treated as an input parameter to the optimization problem. In the following, it will be explained how to obtain r(t). Contrary to OLTP workloads, these workloads are not affected by a higher replication factor.

It seems plausible to set r(t) as low as possible because a high replication factor leads to a more constrained RTP due to (3). Sometimes, increasing the number of replicas beyond 2 is necessary whenever the load of a tenant T is so high that it cannot be handled by a single server. In that case, the round-robin load balancing assumption allows to scale-out across multiple servers (by increasing the number of replicas). The number of copies r(t) of a tenant t must be chosen such that l(t)/r(t), i.e., the load that t puts onto a server, does not exceed the load capacity $cap_l(i)$ of a server Si. In addition, server Si must be able to handle the extra load coming from another server failing that also holds a copy of t. Hence, r(t) has to be chosen such that the following inequality holds.

$$\frac{l(t)}{r(t)} + \frac{l(t)}{r(t)^2 - r(t)} \leq cap_l(i) \quad (7)$$

$$\forall i \in N$$

Re-arranging Inequality (7) for r(t) and keeping in mind that RTP requires any tenant T to have at least two replicas, a lower bound on the number of replicas per tenant r(t) is defined as follows:

$$r(t) := \max\left(2, \left\lceil \frac{l(t)}{cap_l(t)} + 1 \right\rceil\right)$$

In the following it is referred to FIG. 5. Here an example shows that increasing the number of replicas beyond r(t) may yield placements with fewer servers, which contrasts the intuition that a lowest number of replicas is desirable.

Figures 5A, 5B:
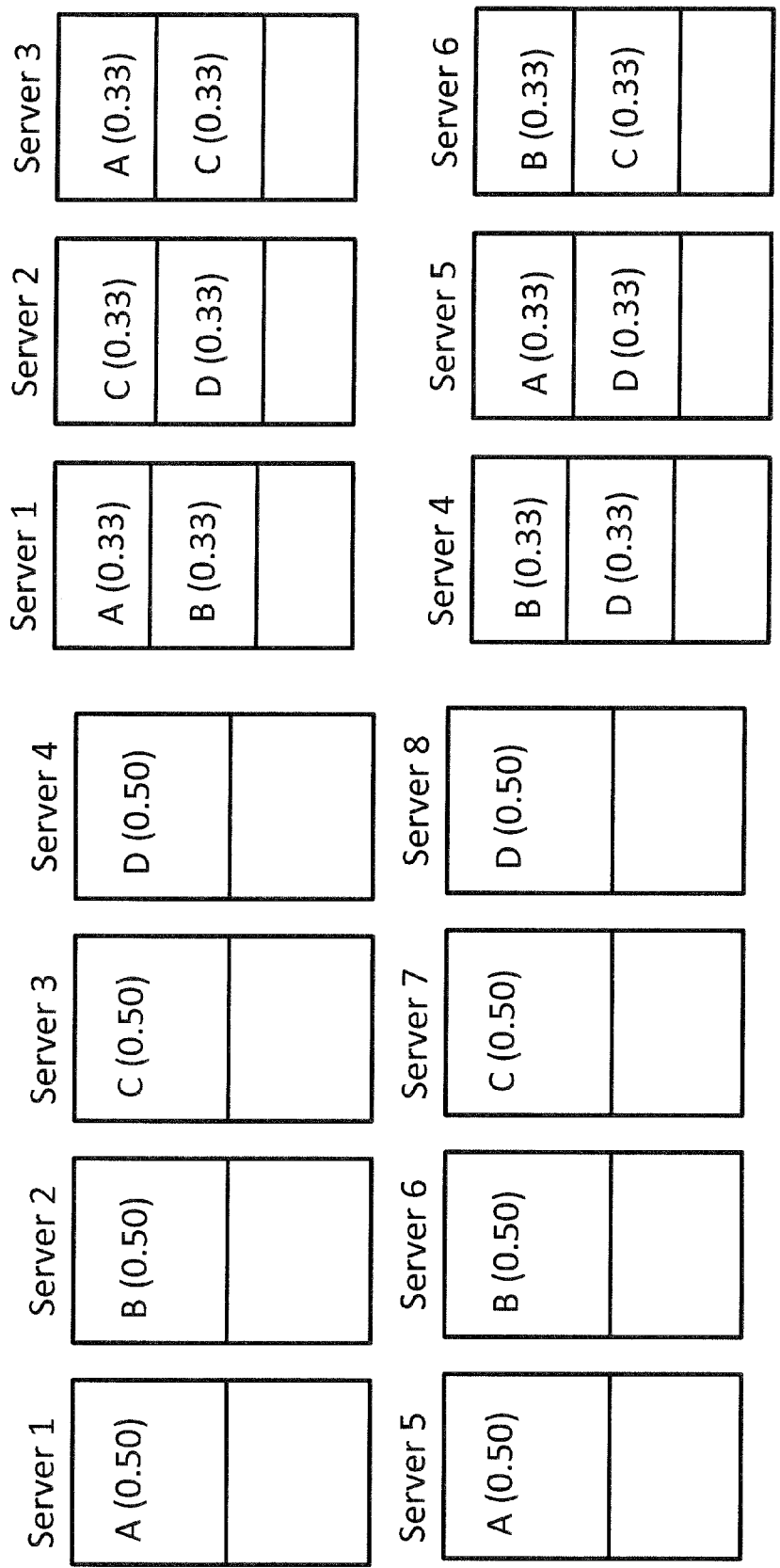
FIGS. 5A and 5B are each a schematic drawing referring to a required number of servers dependent on the number of replicas.

Example 1 in FIG. 5 considers four tenants A to D, each with a load 1.0 and servers S with capacity 1.0. For two replicas per tenant T, as shown in FIG. 5 (a), eight servers S are necessary to place all tenants T. The load on all servers S including spare capacity reserved to accommodate potential server failures (i.e., $p_i$) is 1.0. If three replicas per tenant T are allowed, as shown in FIG. 5 (b), then a total of six servers are sufficient. Also in this case, the load on all servers S including $p_i$ is 1.0.

Example 1 suggests using the number of copies per tenant T as a variable in RTP as opposed to merely an input parameter.

In the following a recovery-aware placement will be described in more detail. Until now, the RTP has been formulated such that a tenant placement must be robust towards one server failure. When a server fails, however, it must be possible to migrate the tenants T on the failed server to a new server. Migration should not cause overloading of the remaining servers holding copies of the failed tenants T.

Migrations consume resources on any server i, which temporarily reduces the server's capacity for processing requests ($cap_i(i)$). How much the capacity degrades during migration depends on the actual schema and workload. The impact of a migration could differ on the migration source and migration destination server. Evaluations and experiments show that the overhead for migrating an in-memory database was determined to be 15% on the source server and 18% at the destination server. For the formal exposition of the RTP, the deterioration factor on a migration source server is defined as µ with 0<µ<1.

According to a preferred embodiment, the costs and/or the migration overhead, which preferably may be calculated and detected separately for a server acting as migration source or as migration destination may be outputted on a respective interface. Generally, the result of the method for placement and migration may be executed automatically and may be represented by a schematic composition (textual and/or graphical) of a tenant placement or migration. The representation may be visualized on a (graphical) user interface. Optionally, the migration costs may be outputted on an interface in order to be validated before being executed.

In order for a placement to allow for safe tenant migration, it must thus contain at least one server S for every tenant T that has enough spare capacity to act as the source server of a migration. In situations where one server S has failed and must be recovered, this allows for migrating tenants T without overloading the remaining servers, as formulated in Constraint (8).

$$\forall t \in \exists i \in N: \sum_{t' \in T} \sum_{k \in R} \frac{l(t)}{r(t)} * y_{t',i}^{(k)} + p_i < \mu * cap_l(i) * s_i \quad (8)$$

Constraint (8) enforces that enough spare capacity for every possible tenant migration is reserved via $\mu * cap_l(i)$.

So far, (static RTP) embodiments have been explained where tenants' loads change over time has not been considered.

Further embodiments refer to an incremental placement scheme, which will be described in more detail below. If a load change occurs, it is mandatory to consider the current placement of the tenants T before migrating. Simply solving RTP again would most likely be too expensive in terms of migration cost.

Thus, RTP has to be solved periodically using an existing or given placement as the starting point. This is called an incremental RTP (as opposed to static RTP as described above). The length of the reassignment interval limits the amount of data migration and thus the amount of change that can be applied to the original placement. The size of a tenant T dictates how long it takes to migrate the tenant T.

In a preferred embodiment, migrations or migration commands may be performed in parallel. The amount of migration that is permissible in each step also depends on the extent to which migrations can be performed in parallel. It is assumed that a fixed amount of data can be migrated in each step and all of the experiments were conducted with a varying move budget.

In addition to the input data for incremental RTP, the incremental version of the placement problem has an existing placement $y_{t,i}^{r(k)}$ and a move budget $\delta \in \mathbb{N}$ as input variables.

It is to be noted that in the following it is departed from the notational convention and sub-indices for the input parameter y' are used. It is defined:

$T_{mig} := \{t \in T:$ a copy of t was moved$\}$.

The following constraints are required in addition to RTP:

$$\forall i \in N: i \text{ is migrating target } \sum_{t \in T} \sum_{k \in R} \frac{l(t)}{r(t)} * y_{t,i}^{(k)} + p_i \le v * cap_l(i) * s_i \quad (9)$$

Similar to Constraint (8), Constraint (9) expresses the temporary capacity drop v when migrating tenants T onto a destination server S.

$$\sum_{t \in T_{mig}} \sigma(t) \le \delta \quad (10)$$

Constraint (10) ensures that the migration budget $\delta$ is never violated.

$$\forall t \in T_{mig} \exists i \in N: \sum_{t' \in T} \sum_{k \in R} \frac{l(t')}{r(t)} * y_{t',i}^{(k)} + p_i \le cap_l(i) * s_i \quad (11)$$

Constraint (11) is less restrictive than the rather similar Constraint (8) because only tenants T that are in fact moved need a server S with enough spare capacity to act as a migration source. Constraint (11) takes the previous placement into account. Like Constraint (10), in cases of extreme load changes between intervals, Constraint (11) may render the incremental RTP infeasible. After all, a possibly changed load l(t) of a tenant t is used with the tenant t still residing on a server S where it was placed when it had a different load (observed in the previous interval). When an infeasibility occurs, it may become necessary to tolerate violations of the SLO for a short period of time, i.e., some constraints must be dropped. Additionally, a change in objective function becomes necessary so that SLO violations are minimized. Instead of minimizing the number of active servers, a placement shall be found with the least amount of overloaded servers which can be formalized as follows. A variable $e \in \mathbb{Q}_+^N$ introduced, which measures the overload of a server. For $i \in N$, the following equation holds:

$$e_i = \sum_{t \in T} \sum_{k \in R} \frac{l(t)}{r(t)} * y_{t,i}^{(k)} + p_i - cap_l(i)$$

and alternative objective functions are $$\min \sum_{i \in N} e_i \text{ or } \min \max_{i \in N} e_i.$$

Changes in tenants' DRAM consumption are negligible here and are therefore not included in $e_i$.

Algorithms for RTP:

Below it will be described how algorithms have been developed that solve RPT while adhering to all constraints described above.

Algorithms for Static RTP:

Greedy Heuristics:

For the bin-packing problem, greedy heuristics are well-known to deliver good results. Another reason for considering greedy variants is their speed. Even for short migration intervals, a greedy heuristic can be used when more complex algorithms are prohibitive.

The greedy algorithms applied for the method according to an embodiment of the present application are loosely based on the well-known best-fit algorithm. When placing a single replica of a tenant T, for each server S its total load including its penalty is computed. The penalty is cached on a per-server basis to speed up computation. The servers S are then ordered according to load plus penalty in decreasing order. Similar to best-fit, the first server S that has enough free capacity is selected. If no active server has enough capacity, then the tenant T is placed on a new server S.

Besides load plus penalty on the servers, it is necessary to take the other constraints of static RTP into account:

A tenant t cannot be added to a server S if the penalty p of another server T would increase in a way that T is beyond capacity.

Furthermore, tenant t cannot be placed on server S if another tenant loses its safe migration source as a consequence of adding the t. This happens when the load on the target (or destination) server i after adding a replica of t is larger than $\mu * cap_l(i)$ and the server S in question previously was the only safe migration source for any of the tenants T assigned to it. Naturally, a tenant T cannot be added to a server S if not enough DRAM is available on the server S.

This basic mechanism for placing a single replica of a tenant T is the basis for the algorithms robustfit-s-mirror and robustfit-s-interleaved. Robustfit-s-interleave starts out by sorting all tenants T by load (in descending order) and places the first replica of each tenant T. Since there is no penalty when there is only one copy, the algorithm assumes a server capacity of $$\frac{\mu * cap_l(i)}{2}$$

in this step. Then all servers S are mirrored. Finally, the algorithm places additional replicas individually for tenants T that require more replicas than the lower bound. Robustfit-s-interleaved also sorts all tenants and then, tenant after tenant, places all replicas of each tenant. For the first replica of each tenant T a server capacity of $\mu * cap_{l(i)}$ is assumed. For all other replicas the algorithms assume a capacity of $cap_l(i)$. This results in a placement where each tenant has a safe source server. Also, tenant replicas are naturally interleaved across servers. Both algorithms are of quadratic complexity and run fast for the problem sizes that are considered for this allocation method.

Robustfit-s-2atonce is the only greedy algorithm that does not build upon the best-fit approach for placing individual replicas. Instead, for one tenant at a time, it tries to find two servers among the currently active servers to which a replica of the tenant can be assigned in one step. In the worst case it explores $$\frac{|N| * (|N| - 1)}{2}$$

options in this step. In case no server pair can be found such that the two copies of the tenants T can be placed in a valid way, two new servers S are created. Similar to the previous algorithms, this algorithm places additional replicas individually for tenants requiring more than two replicas in a final step. Robustfit-s-2atonce also naturally interleaves tenants T but it has a higher computational complexity.

Metaheuristic: Tabu Search:

Having considered fast greedy heuristics, a computationally more expensive heuristic is considered next, which can improve upon solutions, e.g. obtained by the greedy algorithms. A variant of Tabu search is proposed, which is used as a local search improvement heuristic. The Tabu search here tries to remove an active server S given a solution of RTP by traversing the search space as follows. Every valid solution of RTP is a point in the search space. It is moved from one valid solution to another valid solution by moving a tenant t from S to a different server T, even if this move leads to an invalid placement. Next, possible conflicts are fixed (if possible without placing a tenant on S). In order to avoid both cycling and stalling in a local optimum, a so-called Tabu list stores a move (t, S, T) and only the move (t, S, T) is allowed if it was not already contained in the Tabu list. If the list reaches a certain length, then the oldest element is removed and the corresponding move is hence allowed again. The search aborts if—after a certain number of iterations—no placement was found that does not use S. If a solution without S was found, the Tabu search continues from the new solution with the goal of removing another server from the placement.

The performance of the above algorithm relies on the careful adjustment of its parameters: the length of the Tabu list, the choice of server(s) to be cleared out, the order of tenants to be moved, the approach to fixing conflicts in invalid solutions, and the number of restarts, just to name a few.

Framework for Incremental RTP:

A further embodiment is described below with regard to a framework, which consists of six phases. The six phases may be applied separately and also independently of each other and in another sequence. They are executed at the beginning of each re-organization interval, independent of the algorithm that is currently run. Individual algorithms must plug in a method for placing a single replica of a tenant or replace entire phases. Such a method is for example the best-fit method described above. An incremental algorithm can also provide an own implementation for individual phases in the framework. The six phases of this framework are as follows.

1. Delete unnecessary replicas. When the load of a tenant T has decreased in comparison to the previous interval, it might be the case that removing a replica of the tenant T is possible. See also the discussion on the lower bound on the number of replicas per tenant T above. Therefore, in this phase, a heuristically selected replica of all tenants meeting this condition is deleted. Note that deleting a tenant does not count towards the migration budget.
2. Ensure migration flexibility. This phase ensures that all tenants T are assigned to at least one server S from which the tenant can safely be migrated away without SLO violation. This is done by moving one replica of a tenant T without a safe migration source to another server. For determining this server S, the plugged in algorithm is used.
3. Create missing replicas. This phase handles the opposite case of phase 1, where the lower bound on a tenant's replicas has increased as a result of increasing load. The plugged in algorithm is used to place enough extra replicas as necessary to match the new lower bound.
4. Fix overloaded servers. The goal of this phase is to repair overloaded servers S. The approach is to move as many tenants T away from an overloaded server S that it is no longer overloaded. Other servers S must be found for the tenant replicas to be moved. This step is handled by the plugged in algorithm.
5. Reduce number of active servers. All servers S are ordered by total load plus penalty. Then, all tenants T on the most lightly loaded server S are moved to other servers using the plugged in algorithm. This phase is repeated with the next server until the remaining migration budget is smaller than the total size of all tenants on the server S.
6. Minimize maximum load. At the point where it is no longer possible to reduce the number of servers S, this phase tries to flatten out the variance in load plus penalty across all servers. The goal is to avoid having servers S in the placement that have a much higher penalty than other servers S. Again, the plugged in heuristic is used. This phase terminates when the migration budget is exhausted or additional migrations would have too small an effect on the variance.

The order of execution of the above steps (framework) is in itself a heuristic and the steps may be applied in varying order or sequence. Further, it is possible to apply only one or specific steps of the above mentioned steps within the method for placement and migration according to present application. For example, experimentation has revealed that executing phase 4 after phase 2 results in fewer servers than the inverse order. The reason is that some overloaded servers are repaired as a side product of finding a safe migration source for tenants.

Further it should be noted that the specific implementation referring to the aspect how many replicas a tenant should have is orthogonal to this framework. Similar to algorithms for placing individual replicas, different strategies for determining the replication factor can be plugged in. The standard method is to use exactly as many replicas as suggested by the lower bound. Another method is to increase the lower bound by a fixed offset. A more sophisticated method is to set the number of replicas across all tenants in a way that all replicas receive more or less the same load. A last method is to repair overloaded servers in phase 4 by creating additional replicas elsewhere, thus decreasing the load of the tenant on the overloaded server.

In the following plugin algorithms are discussed that have been developed for this framework.

Greedy Heuristics:

The simplest (and also the fastest) algorithm is robustfit. It merely entails the method for placing a single replica using best-fit. This method is plugged into the above framework as is.

Based on the observation that the space of possible actions when transforming a given placement into a new placement is very large, splitmerge has been created. This algorithm acts exactly as robustfit but provides an own implementation of phases 4 and 5 in the framework above. In phase 4 the only allowed operation is splitting each overloaded server into two servers. In phase 5, conversely, merging two servers into one is the only legal operation, although multiple server pairs can be merged in one step. Since the underlying best-fit method is very fast, it has been decided to use a more complex procedure for deciding what servers to merge: splitmerge builds up its list of merge pairs by checking whether two servers U and V can be merged for all candidate pairs U×V.

The method in splitmerge for removing servers is effective, yet computationally intensive. Its approach for fixing overloaded servers is rather simple. Essentially, overloaded servers cannot be fixed without creating one new server per overloaded server, which seems too drastic. Therefore splitmerge's implementation of phase 4 is replaced with the standard one again and used best-fit as the plugin heuristic. This approach is called robustfit merge.

Metaheuristic: Tabu Search

The Tabu search is also re-used for the incremental version of RTP: Tabu, which also uses best-fit as its plugin heuristic, replaces phase 5 with the Tabu search. For this algorithm, phase 6 is simply omitted, which saves some migration budget and thereby allows the Tabu search to run a little longer. The next heuristic, tabu-long works exactly as tabu, except that the parameters of the Tabu search are set such that it runs significantly longer (and thus visits more solutions). Finally, robustfit is combined with a Tabu search to obtain tabu-robustfit. Robusffit is used and instead of executing phase (6) in robustfit, the potentially un-used migration budget is used to further improve the solution via a Tabu search. Similar to before, tabu-robustfit-l is the same algorithm as tabu-robustfit but is parameterized to run longer.

Portfolio Approach:

The portfolio approach combines all heuristics for the incremental RIP. All heuristics are run, starting from the same, best-known solution. The best solution is then selected among all algorithms as the next solution. Choosing the best solution as the next solution is itself a heuristic approach. Instead of simply running all algorithms, more sophisticated machine learning techniques could be applied to choose a promising algorithm.

Static vs. Incremental RTP:

In experiments it was evaluated how close algorithms for the incremental RTP get to the solutions of the static algorithms. It turns out that robustfit-s-mirror is the worst static algorithm in terms of server cost but also the fastest. The other static algorithms perform fairly similar in regard to server cost. In 129 out of 144 cases, a CPLEX optimization (as a MIP-solver; MIP: mixed integer program), was not able to improve the best heuristic solution and spent most of its 4 hour computing time per tick on improving the lower bound. Surprisingly, robustfit performs as good as the static algorithms in terms of server costs even though it seems that the incremental RTP is a much more constrained problem.

Experimental evidence relating to varying the number of replicas per tenant T: In further experiments (based on robustfit) it was found that the maximum number of servers observed during peak loads changes drastically as the offset increases. Therefore, increasing the number of replicas before load changes could help to reduce the number of servers needed.

The quality of placements for high replication factors during peak load is explained as follows. For higher number of replicas, the focus of the RTP shifts from load being the tightest constraint to size being the dominating constraint. As the size of a tenant T does not change over time, some of the dynamics of the RTP are removed. Furthermore, the absolute load changes are smoothed by a higher number of replicas and therefore, the changes in the placement caused by sharp load increases are less drastic.

In this application an implementation for RTP has been suggested and a variety of algorithms have been introduced to successfully solve real-world instances. Cost savings of an order of magnitude are possible based on this approach.

The following algorithms are evaluated to be superior: Robustfit delivers comparably good placements very fast, while tabu-robusffit delivers close to best-in-class placements with reasonable running times. Both algorithms also produce placements that are very robust toward load changes that occur before they can be corrected. Even though both algorithms solve the incremental RTP, their performance almost matches the performance of (complete) algorithms for the less constrained static RTP.

In summary, the present invention is a mechanism for placing and migrating tenants T on servers S, which is performed by executing a migration command. The migration command replicates each of the tenants separately and interleaved on a varying number of servers S, so that a number of allocated servers S in the cluster may be minimized, while maximizing performance of the server cluster as a whole. The migration command always assigns at least two replicas of a tenant T to a number of servers S. The migration command is adaptive as it considers that the input parameters may vary/change over time. In a preferred embodiment the input parameters are: the number of tenants T, the number of replicas of a tenant T, the number of servers S and/or the workload of at least one tenant T.

The migration command dynamically calculates the placement or migration for variable (online measured, dynamically detected) input parameters and ensures that the placement and migration is robust against failure(s) of a server S (by providing the interleaved tenant replication) and reduces operational costs (by continuously or permanently minimizing the number of active servers in the cluster). Further, the migration command ensures that all (pre-configurable) SLO constraints are met.

The migration of tenants T form a given first (or original, source) placement to a second target placement and considers the costs for migration. Therefore, in a first step a set of possible migrations (possible target placements) is computed. In a second step the computed set of possible migrations is evaluated with respect to the costs evolved, wherein the costs are calculated for the whole cluster with respect to failsafeness and overall performance. The evaluation takes into account tenants' interdependencies. If one parameter of the cluster system changes (for example, failure of a specific server, workload changes of a specific tenant, a change of available servers or requiring tenants etc.) its impact on the other system instances (tenants, servers) is automatically evaluated.

The example embodiments mentioned above are to be considered in all respects only as illustrative and not restrictive. The scope of the invention is, therefore, indicated by the appended claims rather than by this description.

REFERENCE NUMERALS

T Tenant
S Server
C Controller
M Measurement means
D Detection module
P Penalty

What is claimed is:

1. A method for controlling allocation of a set of atomic tenants (T) to database servers (S) in a server cluster, comprising the following steps:
dynamically and incrementally measuring workload of all or selected tenants (T) within a pre-configurable recording period and providing measurement signals, taking into account additional workload due to a hardware failure and/or a tenant's access requests;
detecting a DRAM capacity of each server (S); and
applying an adaptive and recovery-aware migration command for continuously controlling allocation of the set of tenants (T) to servers (S), wherein the migration command:
is based on the measurement signals and on the detected DRAM capacity of each of the servers (S);
allocates tenants (T) to servers (S) by applying an interleaved replication so that not the whole server (S) is replicated, but each tenant (T), which has been allocated to a server (S) is replicated separately and interleaved in order to recover overload situations, wherein at least two replicas of a number of tenants (T) are allocated to a number of servers (S) and thereby minimizing a number of allocated servers (S) in the cluster, while maximizing performance of the server cluster;
wherein the migration command is based on an incremental placement algorithm, when placing a single replica of a tenant (T) on a server (S), and
wherein the migration command comprises the following steps, when placing a single replica of a tenant (T) on a server (S):
computing for each server (S) its load and its penalty (p) and generating an ordered server result list; and,
allocating a respective tenant (T) according to the ordered server result list by taking into account a migration budget.

2. The method according to claim 1, wherein the migration command is based on a static placement algorithm, which uses a greedy algorithm and which is based on a best-fit-algorithm, a robustfit-s-mirror algorithm, a robustfit-s-interleaved or a robustfit-s-2atonce algorithm.

3. The method according to claim 1, wherein a number of replicas is computed dynamically based on the load, wherein the load is distributed over all copies of a tenant (T) and wherein at least one replica of a tenant (T) is removed if it is detected as unnecessary if a lower bound signal is detected and is meeting a removal condition.

4. The method according to claim 1, wherein a safe migration mechanism is applied, which ensures that all tenants (T) are assigned to at least one server (S) from which a specific tenant (T) can safely be migrated away without an SLO violation.

5. The method according to claim 1, wherein at least one replica of a tenant (T) is added if an updated lower bound signal is detected and is meeting an addition condition.

6. The method according to claim 1, wherein server overload is detected dynamically and in case of an overloaded server (S), as many tenants (T) as necessary are moved away from the overloaded server (S).

7. The method according to claim 1, wherein the migration command migrates tenants (T) between the servers (S) of the cluster of servers (S) in order to minimize the utilization of the server cluster as a whole and/or may be used to predict a tenant's load before load changes occur to be considered for tenant placement.

8. The method according to claim 1, wherein, when it is no longer possible to reduce the number of allocated servers (S) in the cluster, the migration command ensures that no servers (S) are allocated that have a much higher penalty (p) than other servers (S).

9. The method according to claim 1, wherein the migration command is applied for an un-allocated set of tenants (T) so that tenants (T) are to be allocated to the set of servers (S) in the cluster for the first time or the migration command is applied for already allocated tenants (T) so that a given tenant-server-placement has to be changed.

10. The method according to claim 1, wherein the migration command considers migration costs.

11. The method according to claim 1, wherein a trigger signal is detected which triggers applying the continuous and recovery-aware migration command, wherein the trigger signal refers to the periodically measured workload of all servers (S) in the cluster and to a result of a placement algorithm, which is monitored dynamically.

12. The method according to claim 1, wherein the migration command ensures that a tenant's (T) load does not exceed the DRAM capacity and the processing capabilities of the server (S) to be allocated, wherein spare capacity on each server (S) is reserved for excess load of a failed server (S) which is captured by a penalty (p).

13. The method according to claim 1, wherein a number of servers (S) and/or a number of replicas per tenant (T) is variable, is at least one, and is determined dynamically.

14. The method according to claim 1, wherein the migration command controls tenant allocation and ensures that a replica of the set of replicas of a respective tenant (T) is assigned to a server (S) exactly once.

15. The method according to claim 1, wherein the migration command ensures that no two copies of the same tenant (T) are placed on the same server (S).

16. A computer program product stored on a non-transitory computer-readable medium, the computer product being operable, when executed on at least one computer, to perform the method steps of claim 1.

17. The method according to claim 1, wherein the incremental placement algorithm is selected from the group consisting of a tabu algorithm, a robustfit algorithm, a robustfit-merge, and a splitmerge algorithm.

18. A method for controlling allocation of a set of atomic tenants (T) to database servers (S) in a server cluster, comprising the following steps:
dynamically and incrementally measuring workload of all or selected tenants (T) within a pre-configurable recording period and providing measurement signals, taking into account additional workload due to a hardware failure and/or a tenant's access requests;
detecting a DRAM capacity of each server (S); and
applying an adaptive and recovery-aware migration command for continuously controlling allocation of the set of tenants (T) to servers (S), wherein the migration command:
is based on the measurement signals and on the detected DRAM capacity of each of the servers (S);
allocates tenants (T) to servers (S) by applying an interleaved replication so that not the whole server (S) is replicated, but each tenant (T), which has been allocated to a server (S) is replicated separately and interleaved in order to recover overload situations, wherein at least two replicas of a number of tenants (T) are allocated to a number of servers (S) and thereby minimizing a number of allocated servers (S) in the cluster, while maximizing performance of the server cluster;
wherein, when it is no longer possible to reduce the number of allocated servers (S) in the cluster, the migration command ensures that no servers (S) are allocated that have a much higher penalty (p) than other servers (S).

* * * * *

UNITED STATES PATENT AND TRADEMARK OFFICE
CERTIFICATE OF CORRECTION

PATENT NO. : 9,525,731 B2
APPLICATION NO. : 13/975647
DATED : December 20, 2016
INVENTOR(S) : H. Plattner et al.

It is certified that error appears in the above-identified patent and that said Letters Patent is hereby corrected as shown below:

In the Specification

In Column 17:
Line 47: insert -- is -- before "introduced".

In Column 21:
Line 19: delete "Robusffit" and substitute -- Robustfit -- therefor.

In Column 21:
Line 27: delete "RIP" and substitute -- RTP -- therefor.

In Column 22:
Line 3: delete "tabu-robusffit" and substitute -- tabu-robustfit -- therefor.f Signed and Sealed this
Twenty-first Day of March, 2017

Michelle K. Lee
*Director of the United States Patent and Trademark Office*